United States Patent [19]

Vercellotti et al.

[11] 4,238,781
[45] Dec. 9, 1980

[54] CAPACITIVE ANGULAR DISPLACEMENT TRANSDUCER FOR REMOTE METER READING

[75] Inventors: Leonard C. Vercellotti, Oakmont; Richard A. Johnson, Murrysville, both of Pa.

[73] Assignee: Westinghouse Electric Corp., Pittsburgh, Pa.

[21] Appl. No.: 10,565

[22] Filed: Feb. 9, 1979

[51] Int. Cl.³ .................. G08C 9/02; G08C 19/10
[52] U.S. Cl. ......................... 340/870.37; 324/61 R; 340/347 P
[58] Field of Search ............ 340/177 R, 200, 347 MS, 340/180, 310 A, 347 P, 347 AD, 347 M; 324/60 C, 61 R; 323/93; 318/662

[56] References Cited

U.S. PATENT DOCUMENTS

| | | | |
|---|---|---|---|
| 2,674,729 | 4/1954 | Carter | 340/200 |
| 3,198,937 | 8/1965 | Wooster | 340/200 |
| 3,222,668 | 12/1965 | Lippel | 340/200 |
| 3,238,523 | 3/1966 | Masel et al. | 340/200 |
| 3,296,522 | 1/1967 | Wolfendale | 340/200 |
| 3,421,371 | 1/1969 | Williams | 340/200 |
| 3,702,467 | 11/1972 | Melnyk | 340/200 |
| 3,717,869 | 2/1973 | Batz | 340/347 P |
| 3,732,553 | 5/1973 | Hardway | 340/200 |
| 3,766,544 | 10/1973 | Batz | 340/347 P |
| 3,845,377 | 10/1974 | Shimetori | 340/200 |
| 3,873,916 | 3/1975 | Sterki | 340/200 |
| 4,007,454 | 2/1977 | Cain et al. | 340/200 |

OTHER PUBLICATIONS

"Special Variable Condensers", *Components Handbook,* Blackburn (editor), pp. 288-299.

*Primary Examiner*—John W. Caldwell, Sr.
*Assistant Examiner*—James J. Groody
*Attorney, Agent, or Firm*—E. L. Pencoske

[57] ABSTRACT

A capacitive angular displacement transducer having a rotor plate and a first and second stator plates is disclosed. The rotor plate is coaxially mounted between, and parallel to, the first and second stator plates. The first stator plate is divided into four excitation areas each being impressed with a sinusoidal excitation voltage having a different phase angle. The rotor plate has a first face having two conductive patterns. The two conductive patterns act as resolvers to produce resultant voltages from the vector addition of the voltages variably capacitively coupled thereon due to the excitation voltages. The rotor plate has a second face having two annular conductive areas electrically connected to the conductive patterns of the first rotor face. The second rotor face together with the second stator plate form a constant capacitive pickup for the resultant voltages produced by the two conductive patterns of the first rotor face.

6 Claims, 14 Drawing Figures

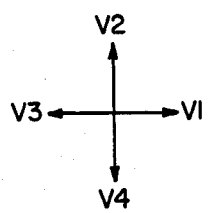
FIG.5.

WHERE θ=0°

FIG.9.
WHERE θ=90°
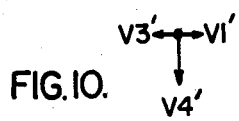
FIG.10.
FIG.11.
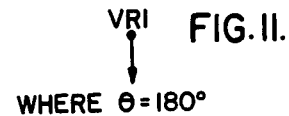
WHERE θ=180°

FIG.13.
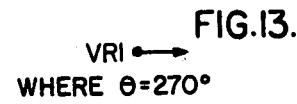
WHERE θ=270°
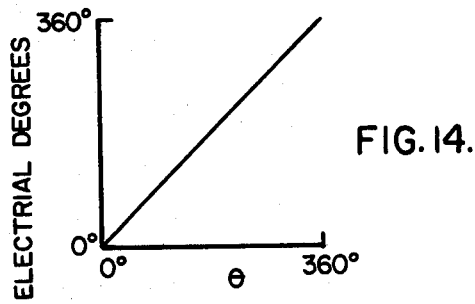
FIG.14.

CAPACITIVE ANGULAR DISPLACEMENT TRANSDUCER FOR REMOTE METER READING

BACKGROUND OF THE INVENTION

1. Field of the Invention

This invention relates to contactless angular displacement transducers which utilize capacitive coupling to produce an electrical output signal. The phase angle of the electrical output signal is proportional to the angular displacement of a shaft.

2. Description of the Prior Art

Contactless angular displacement transducers utilizing capacitive coupling are well known in the prior art. Capacitive transducers can be grouped into three broad categories according to the manner in which the angular displacement information is provided. The first category includes capacitive transducers that produce an electrical output signal having a magnitude related to the angular displacement of a shaft. The second category includes capacitive transducers that directly produce a digital electrical output signal such that each unique combination of zeros and ones represents a position of a shaft. The third category includes those capacitive transducers that produce an electrical output signal having a phase angle related to the angular displacement of a shaft. The present invention belongs to this third category.

U.S. Pat. No. 3,702,467 for a Shaft Position Sensing Device and U.S. Pat. No. 3,873,916 for a Capacitive Sensor For Measuring Displacement Or Position are representative of the first category of capacitive transducers. In U.S. Pat. No. 3,702,467 a fixed plate has a plurality of equally spaced radial conductive bands disposed thereon with every other band connected at its inner extremity to a first annular conductive ring. The remaining conductive bands are connected at their outer extremities to a second annular conductive ring. A third annular conductive area is disposed at the center of the fixed plate. A rotor is mounted parallel to the fixed plate. The rotor has a plurality of equally spaced radial conductive bands connected to an annular conductive area disposed at the rotor's center. This annular conductive area combined with the annular conductive area of the fixed plate provides a constant capacitive pickup between the rotor and the fixed plate thus enabling brushless operation. Signals of opposite polarity are impressed on the two sets of conductive bands of the fixed plate. As the rotor moves relative to the fixed plate a triangular output signal is produced as a result of the alternate capacitive coupling between the conductive band of the rotor and the two conductive bands of the stator. By counting the peak values and the fractional peak values, i.e. measuring the voltage, the position of the rotor relative to the fixed plate may be determined.

In U.S. Pat. No. 3,873,916 a similar principle is used to provide an output signal which varies from a maximum value to a minimum value as a conductive pattern on the rotor moves from a position of maximum capacitive coupling to a position of minimum capacitive coupling with respect to a conductive pattern on the stator. The amplitude of the output voltage is proportional to the relative position of the two patterns, and the number of maximum and minimum values passed through is equal to the number of pattern divisions passed through. By counting the minimum or maximum values and by measurement of the amplitude of the output voltage the movement of the rotor relative to the stator may be determined.

Patents representative of the second category of contactless capacitive angular displacement transducers are U.S. Pat. No. 3,238,523 for a Capacitive Encoder and U.S. Pat. No. 3,766,544 for an Analog-To-Digital Converter Employing Electrostatic Signal Coupling Apparatus. In U.S. Pat. No. 3,238,523 a rotor is provided with a conductive pattern composed of several annular tracks, each track being comprised of alternating conductive and nonconductive areas. A stator is provided with a pattern composed of several pairs of annular tracks, each track being comprised of alternating conductive and nonconductive areas. As the rotor rotates closely adjacent to but slightly spaced from the stator the combination of any one rotor track with a pair of stator tracks produces a plurality of capacitances which vary with angular position of the rotor. By comparing the relative values of the capacitances within each pair of stator tracks a digital code is produced. The number of pairs of stator tracks is determinative of the number of digits in the code. The digital code thus represents the angular position of the rotor.

U.S. Pat. No. 3,766,544 discloses an analog-to-digital converter employing electrostatic signal coupling apparatus. The electrostatic signal coupling apparatus is an electrostatic encoder comprised of a stationary excitation element and a rotor vane. The stationary excitation element is divided into a plurality of excitation segments, with each segment corresponding to one of the shaft positions to be indicated. A set of excitation signals of different phases is impressed on a group of excitation segments. When an excitation signal is supplied to a segment that is under the rotor vane that signal is coupled to an output sensor due to the rotor vane. By sequentially impressing sets of excitation signals on groups of excitation segments a unique set of signals representing a shaft position is coupled to the output sensor. The set of coupled signals is translated to a set of zeros and ones to provide a digital output signal.

The third category of capacitance angular displacement transducers produces an electrical output signal having a phase angle that is related to angular displacement. An example is U.S. Pat. No. 4,007,454 for an Apparatus For Remotely Determining The Angular Orientation, Speed, And/Or Direction Of Rotation Of Objects. A rotating electric field is generated in the vicinity of a rotating member, i.e. a meter hand. The electric field has an axis of rotation coincident with the axis of rotation of the meter hand. An electric field sensing device is positioned at the rotational axis of the electric field for detecting variations of the electric field. Since the permeability of space is the same on both sides of the sensing device, the sensing device reads zero because the two halves of the rotating electric field cancel each other. However, when the electric field is coincident with the meter hand the permeability of the meter hand provides a path for the lines of flux for one-half of the electric field. This imbalance in the electric field causes a voltage signal to be picked up by the sensing device. By comparing the phase of the voltage signal picked up by the sensor to a reference signal the angular orientation of the meter hand may be determined.

The previous discussion is intended to illustrate the diversity in the prior art. Although all are examples of capacitive angular displacement transducers, different hardware and physical configurations are used to implement differing theories of operation. Accordingly, the prior art belonging to the third category is most appropriate and will therefore be discussed in further detail.

Another patent belonging to the third category of angular displacement transducers is U.S. Pat. No. 3,845,377 for a Rotation Angle Transducer. A contactless angle transducer is disclosed comprising a fixed stator plate having a plurality of electrically isolated sector members, a parallel confronting plate spaced apart from the stator plate, and a sector rotor plate situated between the stator and confronting plate and rotatably coupled to the rotatable object. AC excitation voltages having a triangular waveform and a fixed phase relationship are impressed on the sector members of the fixed stator plate. The rotor plate is used to couple the excitation voltages from the fixed stator plate to the confronting plate. Since the location of the rotor plate is a function of angular position of the rotatable object the voltage coupled to the fixed plate is also a function of angular position of the rotatable object. By comparing the phase angle of the coupled voltage to the phase angle of a reference voltage the angular position of the rotatable object can be determined.

Prior art capacitive angular displacement transducers which are used to remotely read a meter, such as a watthour meter, depend on extremely small values of capacitive coupling. Stray capacitances are not negligible compared to the small values of capacitance found in typical prior art transducers and may lead to errors. Similarly, since the capacitance is small the voltage signal coupled by the capacitance is also small making the prior art transducers very susceptible to errors due to noise or the induction of unwanted voltages. Another source of error in prior art transducers is due to the misalignment of the stator and rotor plates. This misalignment can be either a lack of concentricity between the stator and rotor plates or the stator and rotor plates may be out of parallel. The present invention is a new and useful capacitive angular displacement transducer which compensates for these errors. Other benefits will become apparent from the description of the preferred embodiment.

SUMMARY OF THE INVENTION

This invention teaches a contactless, capacitive, angular displacement transducer suitable for remotely reading meters. A first stator plate is divided into a plurality of electrically isolated excitation areas. A plurality of sinusoidal excitation voltages having sequential phase angle variations are impressed on the excitation areas. A second stator plate is parallel to and slightly spaced from the first stator plate. A rotor plate is coaxially mounted parallel to, and between, the first and second stator plates. The first face of the rotor plate is parallel to the first stator plate. The first rotor face has two conductive patterns which act as resolvers. Each pattern produces a resultant voltage that is the vector sum of the voltages variably capacitively coupled thereon due to the excitation voltages. The geometries of the conductive patterns are chosen such that the resultant sinusoidal voltages have constant and equal peak values, have a phase angle which varies linearly with angular displacement, and are of opposite polarities. The second face of the rotor plate is parallel to the second stator plate. The second rotor face has conductive areas which are electrically connected to the conductive patterns of the first rotor face. The second rotor face together with the second stator plate form a constant capacitive pickup for the two resultant voltages. The two resultant voltages are a differential output signal that is input to a conventional electronic circuit which detects the phase difference between the differential output signal and a reference voltage signal. This phase difference is an indication of the angular displacement of the rotor plate relative to the first stator plate.

BRIEF DESCRIPTION OF THE DRAWINGS

FIG. 5 is a vector diagram of the excitation voltages;

FIGS. 6 through 13 are vector diagrams of the voltages coupled to the first pattern and the resultant of the coupled voltages for four discrete positions of the rotor plate as it moves through 360 mechanical degrees; and FIG. 14 is a graph showing the relationship between mechanical degrees and electrical degrees.

DESCRIPTION OF THE PREFERRED EMBODIMENT

Figure 1:
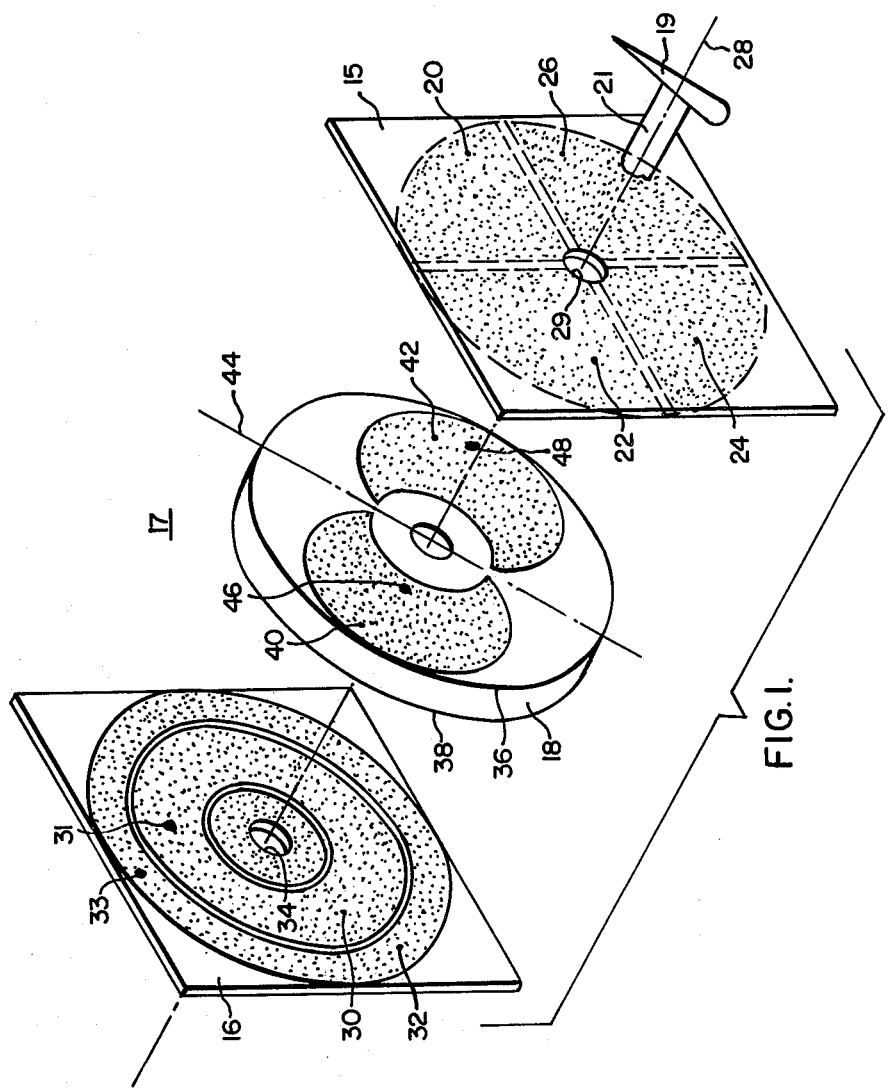
FIG. 1 illustrates the mechanical elements of a capacitive angular displacement transducer constructed according to this invention.

Referring to FIG. 1 the mechanical structure of a capacitive angular displacement transducer 17 constructed according to the present invention is shown. FIG. 1 shows the mechanical elements necessary for determining the position of a dial pointer 19 movable by a shaft 21 which in one preferred embodiment is a watthour meter of the type shown in U.S. Pat. No. 3,309,152. It is to be noted that the mechanical structure shown in FIG. 1 is to be provided for each dial pointer that is to be read.

A first stator plate 15 and a second stator plate 16 are fixedly mounted by means not shown. The first stator plate 15 is parallel to but slightly spaced apart from the second stator plate 16. A rotor plate 18 is coaxially mounted between the first stator plate 15 and the second stator plate 16. The rotor plate 18 is fixed to the shaft 21 and rotates therewith. Additionally, the rotor plate 18 is parallel to both the first and second stator plates, 15 and 16 respectively.

Describing in more detail the mechanical elements shown in FIG. 1 the first stator plate 15 has four electrically isolated excitation areas 20, 22, 24 and 26. The excitation areas 20 through 26 are quarter circular in shape and are symmetrically located about a central axis represented by a broken line 28. An opening 29 is centered around the central axis 28. The opening 29 is provided so that the shaft 21 may pass through the first stator plate 15.

The second stator plate 16 has a first annular conductive area 30 concentric with a second annular conductive area 32. Both the first and second annular conductive areas, 30 and 32 respectively, are symmetric about the central axis 28. The first annular conductive area 30 is equal in area to the second annular conductive area 32. The second stator plate 16 also has an opening 34 centered around the central axis 28 so that the shaft 21 may pass through the second stator plate 16. The first annular conductive area 30 has a hole 31 extending through to the opposite side of the second stator plate 16 and a conductor 61 (shown in FIG. 3) extending therethrough. Similarly, the second annular conductive area 32 has a hole 33 extending through to the opposite side of the second stator plate 16 and a conductor 63 (shown in FIG. 3) extending therethrough. The holes 31 and 33 are provided so that signals produced by the annular conductive areas 30 and 32 may be output from the second stator plate 16.

The rotor plate 18 is circular in shape and is constructed of a nonconductive material. The rotor plate 18 is connected at its center to a shaft 21. Further the rotor plate has a first face 36 parallel to the first stator plate 15 and a second face 38 parallel to the second stator plate 16. The first face 36 has a first conductive pattern 40 and a second conductive pattern 42 symmetrically located with respect to the central axis 28. A line 44 bisecting the first face 36 and separating the first pattern 40 from the second pattern 42 shows the top and bottom halves of the first face 36 to be mirror images of one another. The first and second patterns, 40 and 42, respectively, are specially shaped conductive areas which is an important feature of this invention. At any given time these patterns 40 and 42 are juxtaposed with portions of three of the four excitation areas 20, 22, 24, and 26. A further description of the shape of the patterns 40 and 42 and their operational relationship with the excitation areas of the first stator plate 15 is given hereinbelow. The first pattern 40 has a hole 46 extending through to the second face 38 of the rotor plate 36. The second pattern 42 has a hole 48 extending through to the second face 38 of the rotor plate 36. The function of the holes 46 and 48 is described in conjunction with the second rotor face 38, hereinafter.

Figure 2:
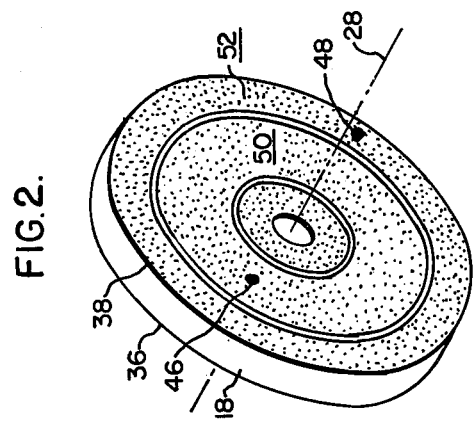
FIG. 2 illustrates the second rotor face.

The second face 38 of the rotor 18 is shown in FIG. 2. The second face 38 has a first annular conductive area 50 concentric with a second annular conductive area 52. Both the first and second annular conductive areas, 50 and 52, respectively, are symmetric about the central axis 28. The first annular conductive area 50 is equal in area to the second annular conductive area 52. The first annular conductive area 50 is electrically connected to the first pattern 40 by a conductive path 57 (shown in FIG. 3) extending through hole 46. The second annular conductive area 52 is electrically connected to the second pattern 42 by a conductive path 59 (shown in FIG. 3) extending through hole 48. The first annular conductive area 50 and the second annular conductive area 52 of the rotor plate 18 are mirror images of, and juxtaposed with, the first annular conductive area 30 and the second annular conductive area 32, respectively, of the second stator plate 16. This juxtapositioning provides a contactless capacitive pickup.

Figure 3:
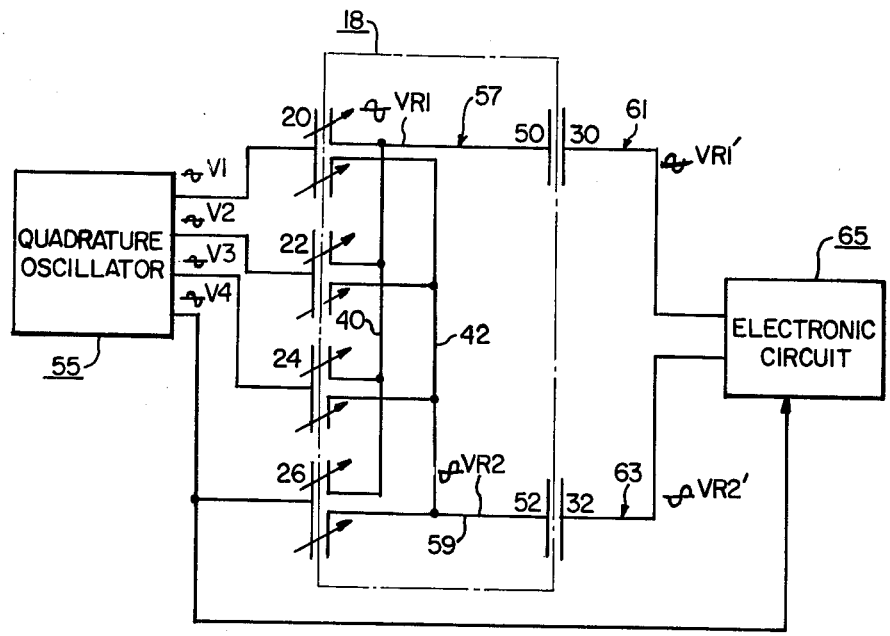
FIG. 3 is an electrical schematic of a transducer constructed according to this invention.

FIG. 3 is an electrical schematic of the angular displacement transducer illustrated in FIG. 1. Identical elements have the same descriptive numbers. A quadrature oscillator 55 impresses four sinusoidal excitation voltages V1, V2, V3, and V4, on the four excitation areas 20, 22, 24, and 26 respectively. As the rotor 18 moves relative to the four excitation areas, the first conductive pattern 40 and the second conductive pattern 42 are juxtaposed with the four excitation areas in varying degrees. This juxtapositioning causes capacitive coupling of varying degrees. Thus, the first conductive pattern 40 and the second conductive pattern 42 are shown as forming variable capacitors with each of the four excitation areas. The first conductive pattern 40 produces a first resultant voltage VR1. Further, the first conductive pattern 40 is connected to the first annular conductive area 50 by the conductive path 57 running through hole 46. Similarly, the second conductive pattern 42 produces a second resultant voltage VR2. Further, the second conductive pattern 42 is connected to the second annular conductive area 52 by the conductive path 59 running through hole 48. The annular conductive areas 50 and 52 of the second rotor face 38 together with the annular conductive areas 30 and 32, respectively, of the second stator plate 16 provide two constant capacitive pickups. The first annular conductive area 30 produces a first output signal VR1' that is proportional to the first resultant voltage VR1. Similarly, the second annular conductive area 32 produces a second output signal VR2' that is proportional to the second resultant voltage VR2. The first output signal VR1' is output from the first annular conductive pattern 30 by the conductive path 61 running through hole 31. The second output signal VR2' is output from the second conductive pattern 32 by the conductive path 63 running through hole 33. The combination of the signals VR1' and VR2' is a differential output signal of the transducer 17. The differential output signal is input to a conventional electronic circuit 65 typically employing a differential amplifier input stage, a phase detector, and an analog-to-digital converter. The electronic circuit 65 also receives one of the excitation voltages V4 which is used as a reference voltage signal by the phase detector.

Figure 4:
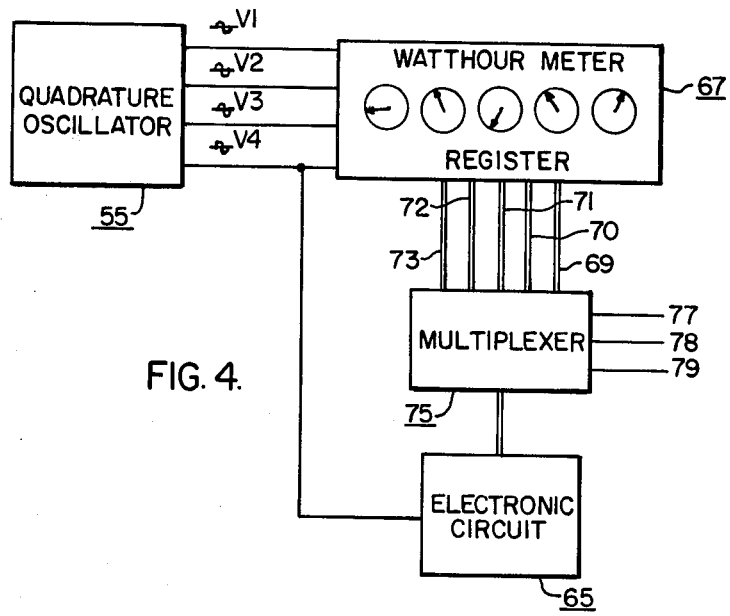
FIG. 4 is a block diagram of a system for remote meter reading utilizing the disclosed transducer.
Figure 6:
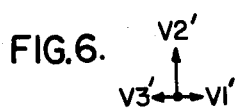
Figure 7:
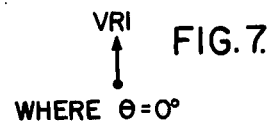
Figure 8:
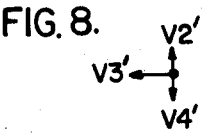
Figure 12:
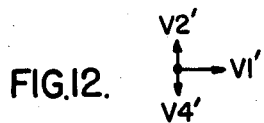

A system for remotely reading a watthour meter utilizing the angular displacement transducer of this invention is shown in block diagram form in FIG. 4. The quadrature oscillator 55 provides four excitation voltages V1, V2, V3 and V4 to a watthour meter register 67 of the type shown in U.S. Pat. No. 3,309,152 employing the angular displacement transducer of this invention. The watthour meter has five dials to be read and therefore has five pairs of output conductors 69, 70, 71, 72, and 73. Each pair of conductors carries the differential output signal indicating the angular position of one meter dial. The conductor pairs 69 through 73 are connected to a multiplexer 75. The multiplexer 75 also receives a three bit code on conductors 77, 78 and 79. The three bit code is used to select one of the differential output signals available on the five conductor pairs 69 through 73. The selected differential output signal is then input to the electronic circuit 65. The electronic circuit 65 also receives the excitation voltage V4 which is used as a reference signal.

It is noted that the physical description of the angular displacement transducer of FIGS. 1 and 2 and the remote meter reading system of FIG. 4 are provided for illustration and are not intended to be limitations. It is anticipated that other physical layouts and remote meter reading systems may be devised that fall within the scope of the present invention.

OPERATION

The operation of the preferred embodiment described above with reference to FIGS. 1, 2 and 3 will now be discussed. The excitation areas of the first stator plate 15 are each impressed with a sinusoidal excitation voltage. V1 is impressed on excitation area 20, V2 on excitation area 22, V3 on excitation area 24, and V4 on excitation area 26. The excitation voltages V1 through V4 all have the same peak values but have a sequential phase difference of ninety electrical degrees. The relationships between the impressed voltages V1 through V4 can be expressed as:

$$V1 = V \sin(\chi t + \beta) \qquad (1)$$

$$V2 = V \sin(\chi t + 90° + \beta) \quad (2)$$

$$V3 = V \sin(\chi t + 180° + \beta) \quad (3)$$

$$V4 = V \sin(\chi t + 270° + \beta) \text{ where} \quad (4)$$

V = constant peak amplitude
χ = angular frequency
t = time; and
β = arbitrary reference point The voltages coupled to the first pattern 40 are a function of the capacitance between the first pattern 40 and each of the four excitation areas 20, 22, 24 and 26. The capacitance between the first pattern 40 and each of the four excitation areas 20, 22, 24 and 26 is a function of the area of the first pattern that is juxtaposed with each of the excitation areas. The area of the first pattern that is juxtaposed with each of the excitation areas is a function of angular displacement. It follows that if capacitance is a function of angular displacement the voltages coupled to the first pattern 40 are a function of angular displacement. The voltages coupled to the first pattern can be expressed as:

| | |
|---|---|
| $V1' = KC1(\theta) V1$ | (5) |
| $V2' = KC2(\theta) V2$ | (6) |
| $V3' = KC3(\theta) V3$ | (7) |
| $V4' = KC4(\theta) V4$ where | (8) |
| $V1', V2', V3', V4'$ = coupled voltages | |
| $\theta$ = angular displacement in mechanical degrees | |
| $C1(\theta), C2(\theta), C3(\theta), C4(\theta)$ = capacitance as a function of angular displacement $\theta$, and | |
| K = constant. | |

Substituting equations (1) through (4) into equations (5) through (8), respectively, yields:

| | |
|---|---|
| $V1' = KC1(\theta) V \sin(\omega t + \beta)$ | (9) |
| $V2' = KC2(\theta) V \sin(\omega t + 90° + \beta)$ | (10) |
| $V3' = KC3(\theta) V \sin(\omega t + 180° + \beta)$ | (11) |
| $V4' = KC4(\theta) V \sin(\omega t + 270° + \beta)$ | (12) |

The first pattern 40 acts as a resolver producing a first resultant voltage VR1 that is the vector sum of the coupled voltages. Mathematically,

| | |
|---|---|
| $VR1 = V1' + V2' + V3' + V4'$ where | (13) |
| VR1 = first resultant voltage. | |

Substituting equations (9) through (12) into equation (13) yields:

| | |
|---|---|
| $VR1 = KC1(\theta) V \sin(\omega t + \beta) + KC2(\theta) V \sin$ $(\omega t + 90° + \beta) + KC3(\theta) V \sin(\omega t + 180° + \beta) +$ $KC4(\theta) V \sin(\omega t + 270° + \beta)$ | (14) |

This vector addition may be more easily understood by referring to FIGS. 5 through 13. FIG. 5 is a vector diagram illustrating the four excitation voltages V1, V2, V3, V4. If the first pattern 40 was juxtaposed with the entire area of the four excitation areas 20, 22, 24, 26, the resultant voltage would be zero since the four excitation voltages would cancel each other out. But the first pattern 40 is juxtaposed with only a portion of three of the four excitation areas at any given time so that only a fractional value of three of the four excitation voltages is coupled to the first pattern. It is this fractional value of each of the excitation voltages which changes as the angular displacement changes, i.e. C1 ($\theta$), C2($\theta$), C3($\theta$) and C4($\theta$) change as the angular displacement changes. The four pairs of FIGS., 6 and 7 through 12 and 13, illustrate the vector diagrams of the coupled voltages V1′, V2′, V3′, V4′, and the first resultant voltage VR1 for each of four values of $\theta$ corresponding to four positions of the rotor plate as it turns through 360 mechanical degrees. As can be seen from the vector diagrams each position of the rotor produces a unique first resultant voltage. The first resultant voltage has a constant magnitude and a phase angle that varies through 360 electrical degrees as the rotor plate varies through 360 mechanical degrees. This linear relationship is shown in FIG. 14. By comparing the phase angle of the first resultant voltage VR1 to the phase angle of a reference signal the angular displacement $\theta$ of the rotor plate can be determined.

The first resultant voltage has a constant peak value because the relative proportionality between C1($\theta$), C2($\theta$), C3($\theta$) and C4($\theta$) is kept constant. This is accomplished by choosing the first pattern 40 such that its area A1 satisfies the following two equations:

$$dA1/d\theta = K1 \sin \theta \text{ from } 0° \leq \theta \leq 180° \text{ and} \quad (15)$$

$$dA1/d\theta = 0 \text{ from } 180° \leq \theta \leq 360° \text{ where} \quad (16)$$

dA1 = differential area of the first pattern 40
d$\theta$ = differential angular displacement, and
K1 = constant.

Using equations (15) and (16) the mathematic relationships between C1($\theta$), C2($\theta$), C3($\theta$) and C4($\theta$) may be derived and used to simplify equation (14) to,
$VR1 = K2V \sin(\Omega t + \theta + \beta)$ where (17)
K2 = constant From equation (17) it can be seen that the first resultant voltage VR1 has a sinusoidal wave form. The first resultant voltage VR1 also has a constant peak value and an electrical phase angle that varies linearly with angular displacement.

The preferred embodiment utilizes a second conductive pattern 42 which is a mirror image of the first pattern. That is, the area A2 of the second pattern 42 satisfies the two equations.

$$dA2/d\theta = 0 \text{ from } 0° \leq \theta \leq 180° \text{ and}$$

$$dA2/d\theta = K1 \sin \theta \text{ from } 180° \leq \theta \leq 0.$$

The second pattern 42 produces a second resultant voltage VR2 which is equal in magnitude and phase to VR1 but is of opposite polarity.

The second face 38 of the rotor plate 18 together with the second stator plate 16 provide a constant capacitive pickup since the conductive area of each plate facing the opposite plate is constant and the distance between the plates is constant. The second stator plate 16 produces a first output signal VR1′ proportional to VR1 and a second output signal VR2′ proportional to VR2. The output signals VR1′ and VR2′ are a differential output signal which is input to the electronics 65.

The advantages of using the differential output signal as the input signal to the electronics 65 are several. First, the magnitude of the signal is doubled due to the differential amplifier input stage thus increasing the signal-to-noise ratio. Second, errors due to the parallel misalignment, i.e. if the rotor plate 18 wobbles, are minimized since any decrease in the magnitude of the voltages coupled to the first pattern 40 will result in a corrective increase in the magnitude of the voltages coupled to the second pattern 42, and vice versa. And third, errors due to the concentric misalignment of the first stator plate 15 and the rotor plate 18 are minimized since any decrease in the magnitude of the voltages coupled to one of the patterns of the first rotor face 36 will result in a corrective increase in the magnitude of the voltages coupled to the other pattern.

Briefly summarizing, a capacitive angular displacement transducer is disclosed. A rotor plate 18 is coaxially mounted between a first stator plate 15 and a second stator plate 16. The first stator plate 15 has four excitation areas impressed with excitation voltages having different phase angles. The rotor plate 18 has a first face 36 having two conductive patterns 40 and 42. As the rotor plate 18 moves relative to the first stator plate 15 the excitation voltages are variably capacitively coupled to the conductive patterns 40 and 42. The conductive patterns 40 and 42 act as resolvers to produce resultant voltages from the vector addition of the voltages coupled thereon. The rotor plate 18 has a second face 38 having conductive annular areas electrically connected to the conductive patterns of the first rotor face 36. The second rotor face 38 and the second stator plate 16 form a constant capacitive pickup for the resultant voltages produced by the conductive patterns 40 and 42.

What is claimed is:

1. A capacitive angular displacement transducer producing a differential electrical output signal having a phase angle that varies linearly with the angular displacement of a shaft, comprising:

a first stator plate divided into a plurality of electrically isolated excitation areas such that each excitation area has at most two adjacent excitation areas; means impressing sinusoidal excitation voltages on said excitation areas, the phase of each impressed excitation voltage differing by a fixed and predetermined amount from that impressed on adjacent excitation areas;

a second stator plate;

and a rotor plate movable by said shaft coaxially mounted between said first and said second stator plates, said rotor plate having a first face parallel to and variably capacitively coupled with said excitation areas of said first stator plate, and a second face parallel to and capacitively coupled with said second stator plate, half of said first face having a first electrically conductive pattern such that said first pattern produces a first resultant voltage that is the vector sum of the voltages variably capacitively coupled to said first pattern due to said excitation voltages, said first resultant voltage having a constant peak amplitude and a phase angle that varies linearly with displacement of said rotor plate relative to said first stator plate, the other half of said first face having a second electrically conductive pattern that is the mirror image of said first conductive pattern, said second conductive pattern producing a second resultant voltage that is the vector sum of the voltages variably capacitively coupled to said second pattern due to said excitation voltages, said second resultant voltage equal to said first resultant voltage and of opposite polarity, said second face of said rotor plate having two annular conductive areas, one of said areas electrically connected to said first pattern, the other of said areas electrically connected to said second pattern, said second stator plate comprised of conductive areas forming a constant capacitive pickup with said two annular conductive areas of said second face of said rotor plate, said second stator plate producing a differential output signal responsive to said first and second resultant voltages, said differential output signal having a phase angle that varies linearly with the angular displacement of said shaft.

2. The angular displacement transducer of claim 1 wherein the first stator plate is divided into four excitation areas.

3. The angular displacement transducer of claim 1 wherein the conductive areas of the second stator plate are in a mirror image configuration of the two annular conductive areas of the second face of the rotor plate.

4. The angular displacement transducer of claim 1 wherein the electrically conductive pattern on half of the first face of the rotor plate has a differential area with respect to angular displacement that is proportional to the sine of the angular displacement from 0° to 180° and has a differential area that is zero from 180° to 360°, and wherein the conductive pattern on the other half of said first face has a differential area with respect to angular displacement that is proportional to the sine of the angular displacement from 180° to 360° and has a differential area that is zero from 0° to 180°.

5. A capacitive angular displacement transducer producing a differential electrical output signal having a phase angle that varies linearly with the angular displacement of a shaft, comprising: a first stator plate divided into four electrically isolated excitation areas such that each excitation area has at most two adjacent excitation areas; means impressing sinusoidal excitation voltages on said excitation areas, the phase of each impressed excitation voltage differing by ninety electrical degrees from that impressed on adjacent excitation areas; a second stator plate; and a rotor plate movable by said shaft coaxially mounted between said first and said second stator plates, said rotor plate having a first face parallel to and variably capacitively coupled with said excitation areas of said first stator plate, and a second face parallel to and capacitively coupled with said second stator plate, half of said first face having a first electrically conductive pattern having a differential area with respect to angular displacement that is proportional to the sine of the angular displacement from 0° to 180° and having a differential area that is zero from 180° to 360°, said first pattern producing a first resultant voltage this is the vector sum of the voltages variably capacitively coupled to said first pattern due to said excitation voltages, said first resultant voltage having a constant peak amplitude and a phase angle that varies linearly with displacement of said rotor plate relative to said first stator plate, the other half of said first face having a second electrically conductive pattern having a differential area with respect to angular displacement that is proportional to the sine of the angular displacement from 180° to 360° and having a differential area that is zero from 0° to 180°, said second pattern producing a second resultant voltage that is the vector sum of the voltages variably capacitively coupled to said second pattern due to said excitation voltages, said second resultant voltage equal to said first resultant voltage and of opposite polarity, said second face of said rotor plate having two concentric annular conductive areas, one of said areas electrically connected to said first pattern, the other of said areas electrically connected to said second pattern, said second stator plate comprised of conductive areas in a mirror image configuration of said second face of said rotor plate, said second stator plate producing a differential output signal responsive to said first and second resultant voltages, said differential output signal having a phase angle that varies linearly with the angular displacement of said shaft.

6. A watt hour meter register having a plurality of dial pointers each movable by a shaft, and wherein each shaft carries a capacitive angular displacement transducer producing a differential electrical output signal having a phase angle that vares linearly with the angular displacement of said shaft, each capacitive angular displacement transducer comprising: a first stator plate divided into a plurality of electrically isolated excitation areas such that each excitation area has at most two adjacent excitation areas; means impressing sinusoidal excitation voltages on said excitation areas, the phase of each impressed excitation voltage differing by a fixed and predetermined amount from that impressed on adjacent excitation areas; a second stator plate; and a rotor plate movable by said shaft coaxially mounted between said first and said second stator plates, said rotor plate having a first face parallel to and variably capacitively coupled with said excitation areas of said first stator plate, and a second face parallel to and capacitively coupled with said second stator plate, half of said first face having a first electrically conductive pattern such that said first pattern produces a first resultant voltage that is the vector sum of the voltages variably capacitively coupled to said first pattern due to said excitation voltages, said first resultant voltage having a constant peak amplitude and a phase angle that varies linearly with displacement of said rotor plate relative to said first stator plate, the other half of said first face having a second electrically conductive pattern that is the mirror image of said first conductive pattern, said second conductive pattern producing a second resultant voltage that is the vector sum of the voltages variably capacitively coupled to said second pattern due to said excitation voltages, said second resultant voltage equal to said first resultant voltage and of opposite polarity, said second face of said rotor plate having two annular conductive areas, one of said areas electrically connected to said first pattern, the other of said areas electrically connected to said second pattern, said second stator plate comprised of conductive areas forming a constant capacitive pickup with said two annular conductive areas of said second face of said rotor plate, said second stator plate producing a differential output signal responsive to said first and second resultant voltages, said differential output signal having a phase angle that varies linearly with the angular displacement of said shaft.

* * * * *